United States Patent
Bartsch et al.

(10) Patent No.: US 8,757,212 B2
(45) Date of Patent: Jun. 24, 2014

(54) PULSATION DAMPING CAPSULE

(75) Inventors: Thomas Bartsch, Niedernhausen (DE); Johann Jungbecker, Badenheim (DE); Peter Schack, Seligenstadt (DE); Stefan A. Drumm, Saulheim (DE); Stefan A. Schmitt, Aschaffenburg (DE); Georg Halasy-Wimmer, Vaihingen (DE); Ronald Kley, Seligenstadt (DE); Marc Seckner, Ruppertsberg (DE); Jochen Glas, Tiefenbronn (DE); Andreas Kämpfe, Pforzheim (DE)

(73) Assignee: Continental Teves AG & Co. oHG (DE)

( * ) Notice: Subject to any disclaimer, the term of this patent is extended or adjusted under 35 U.S.C. 154(b) by 980 days.

(21) Appl. No.: 12/867,949

(22) PCT Filed: Feb. 17, 2009

(86) PCT No.: PCT/EP2009/051873
§ 371 (c)(1),
(2), (4) Date: Oct. 14, 2010

(87) PCT Pub. No.: WO2009/103709
PCT Pub. Date: Aug. 27, 2009

(65) Prior Publication Data
US 2011/0017332 A1    Jan. 27, 2011

(30) Foreign Application Priority Data

Feb. 18, 2008 (DE) .................. 10 2008 009 834
Apr. 30, 2008 (DE) .................. 10 2008 021 524
Sep. 16, 2008 (DE) .................. 10 2008 047 303

(51) Int. Cl.
*F16L 55/04* (2006.01)

(52) U.S. Cl.
USPC .................. 138/30; 138/26; 417/540

(58) Field of Classification Search
USPC ............ 138/26, 30; 417/540, 542; 123/495
See application file for complete search history.

(56) References Cited

U.S. PATENT DOCUMENTS

| 4,548,240 A | 10/1985 | Graham |
| 5,460,438 A | 10/1995 | Hellmann et al. |

(Continued)

FOREIGN PATENT DOCUMENTS

| DE | 34 14 558 A1 | 10/1984 |
| DE | 43 11 263 A1 | 10/1995 |
| DE | 195 39 779 A1 | 4/1997 |
| DE | 195 44 223 B4 | 6/1997 |
| DE | 103 53 841 A1 | 10/2004 |
| DE | 103 18 613 B3 | 1/2005 |
| DE | 10 2004 002 489 A1 | 8/2005 |
| DE | 10 2005 036 109 A1 | 3/2006 |
| DE | 10 2005 028 562 A1 | 10/2006 |
| GB | 2 417 050 | 2/2006 |
| JP | 2004138071 A * | 5/2004 |
| JP | 2009174352 A * | 8/2009 |
| WO | WO 01/59319 A1 | 8/2001 |
| WO | WO 01-76926 A1 | 8/2001 |

OTHER PUBLICATIONS

Database WPI Week 198325, Thomson Scientific, 1983; XP-002525703 & SU 950 996 B(AS Geor Mining Mech), Aug. 15, 1982.

*Primary Examiner* — Patrick F Brinson
(74) *Attorney, Agent, or Firm* — RatnerPrestia

(57) ABSTRACT

A pulsation damping capsule including at least one hermetically joint-sealed metal membrane housing made of at least two preferably concave hemispheres, the housing being provided for separating an inner space from a surrounding pressure medium, wherein the hemispheres are connected together along a peripheral seam firmly bonded such that the pulsation damping capsule can be compressed and expanded as an energy accumulator with spring elasticity due to the effect of the pressure medium. A pulsation damping device is provided which is both dimensioned to withstand stresses and is simple to produce, the pulsation damping effect of which can be tailored especially easily to the existing conditions. Further disclosed is a pulsation damping module for housing a plurality of pulsation damping capsules.

25 Claims, 8 Drawing Sheets

(56) References Cited

U.S. PATENT DOCUMENTS

| | | |
|---|---|---|
| 5,730,506 A | 3/1998 | Friedow et al. |
| 8,366,421 B2 * | 2/2013 | Munakata et al. ............ 417/540 |
| 8,393,881 B2 * | 3/2013 | Usui et al. ..................... 417/540 |
| 2002/0153209 A1 | 10/2002 | Nagy et al. |
| 2002/0157906 A1 | 10/2002 | Nagy et al. |
| 2008/0289713 A1 * | 11/2008 | Munakata et al. ............. 138/26 |
| 2013/0052064 A1 * | 2/2013 | Oikawa et al. ................ 417/540 |

\* cited by examiner

US 8,757,212 B2

PULSATION DAMPING CAPSULE

CROSS REFERENCE TO RELATED APPLICATIONS

This application is the U.S. national phase application of PCT International Application No. PCT/EP2009/051873, filed Feb. 17, 2009, which claims priority to German Patent Application No. 102008 009 834.5, filed Feb. 18, 2008, German Patent Application No. 10 2008 021 524.4, filed Apr. 30, 2008, and German Patent Application No. 10 2008 047 303.0, filed Sep. 16, 2008, the contents of such applications being incorporated by reference herein.

FIELD OF THE INVENTION

The invention relates to a pulsation damping capsule, in particular for pulsation damping in electronically regulated vehicle brake systems or other types of pulsation damping applications.

BACKGROUND OF THE INVENTION

In particular, electronically regulated vehicle brake systems have a hydraulic assembly comprising a receiving body with electrohydraulic valves, with at least one hydraulic pump, and with channels for connecting the pump to at least one hydraulic consumer, a pulsation damping unit being provided between a pressure medium volume (THZ/container, low pressure accumulator) and a suction side of the pump or between a pressure side of the pump and the hydraulic consumer. Eccentric-driven radial piston pumps are mostly used. Millions of said hydraulic assemblies are in use.

Each piston displacement during an eccentric revolution can be divided in an extremely simplified manner into a suction stroke (0–n) and into a pressure stroke (n–2n). Because in each case liquid columns are accelerated but also retarded, this leads on the suction side and also on the pressure side to largely sinusoidal instantaneous pressure profiles which can be changed in details as a function of the concrete embodiment or else can be superimposed. In order to compensate for undesired effects of the instantaneous pressure profiles which fluctuate because of their principle, a pulsation damping unit is provided.

For example, it is known from DE 34 14 558, which is incorporated by reference, to use a diaphragm damper with a metal diaphragm for pulsation damping. Conventional diaphragm dampers with a clamped elastomer diaphragm can suffer from the disadvantage that they are subject to wear, with the result that their effect decreases over the length of the service life. The spring properties are dependent on how quickly the loading takes place (dynamic hardening). As a result, they suffer from nonlinear behavior.

DE 10 2005 028 562 A1, which is incorporated by reference, has disclosed a braking hydraulic assembly comprising a hermetically closed metal hollow body for damping purposes.

SUMMARY OF THE INVENTION

It is an object of the present invention to provide a pulsation damping apparatus which is dimensioned suitably for the loading, can also be produced simply, is resistant to high pressure and the pulsation damping action of which can be adapted particularly simply to the prevailing boundary conditions.

The object is achieved in principle by virtue of the fact that a hydraulic branch which is afflicted by pulsation is assigned a defined elasticity which makes it possible to accumulate pressure medium. According to one further independent solution of the problem, a preassembled pulsation damping module is proposed containing a bundle with a plurality of identical pulsation damping capsules. The pulsation damping capsule advantageously has a quasilinear, elastic behavior within a predefined functional pressure range which can reach, for example, as far as approximately 60 bar. Above this predefined functional range, the pulsation damping capsule behaves neutrally as it were, by there being a quasiconstant behavior.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
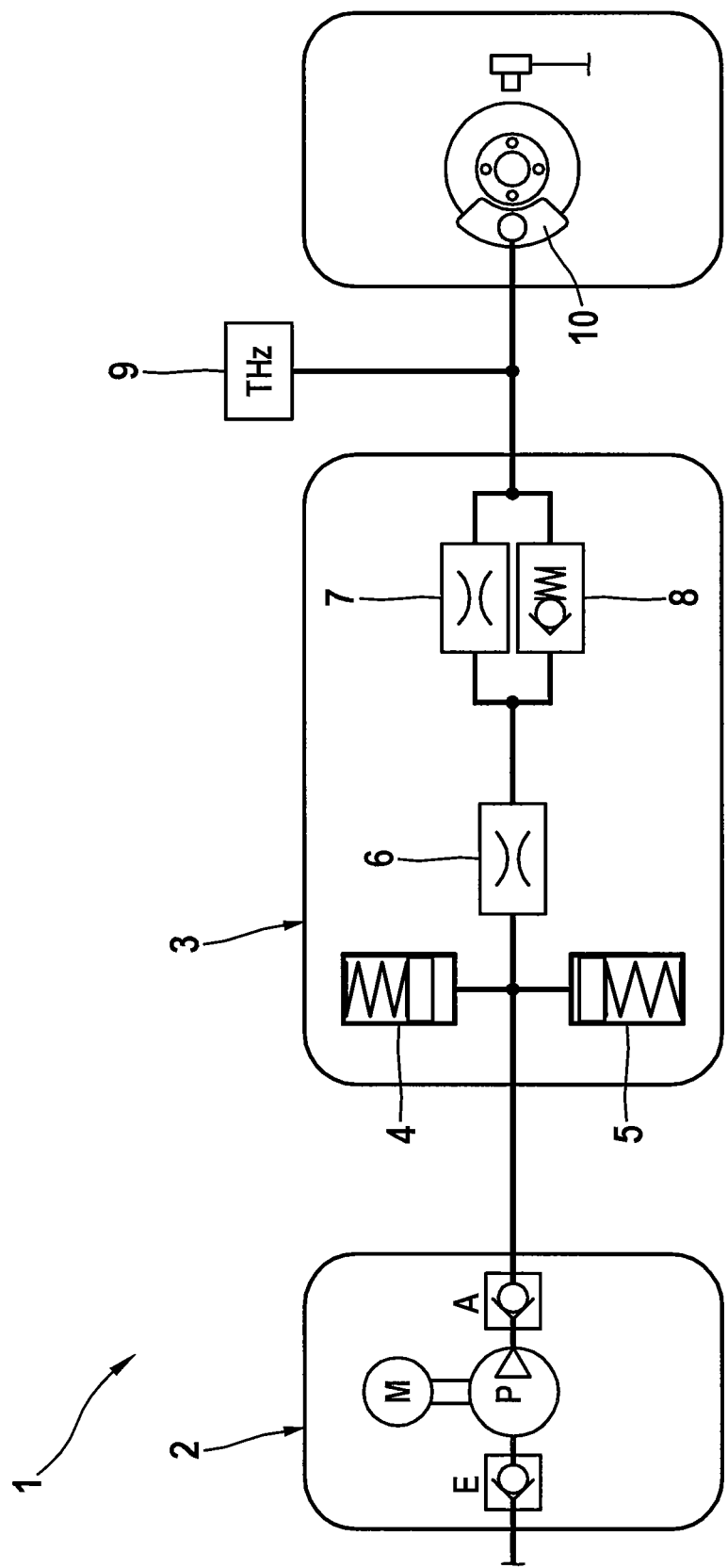
FIG. 1 diagrammatically and partially shows an electrohydraulic vehicle brake system.

In a very diagrammatically simplified manner and with the omission of details and electrohydraulic valves, FIG. 1 illustrates an electronically regulated vehicle brake system 1 having a motor/pump assembly 2 with a pump P, comprising a pressure medium inlet E and a pressure medium outlet A, a damping apparatus 3 being provided in connection with the pressure medium outlet A, containing a plurality of damping means 4, 5, 6, 7, 8 connected in a cascade with the participation of at least one damping chamber. As diagrammatically illustrated, the pressure medium outlet A can be connected to a main cylinder 9 (THZ) or to a wheel brake 10 depending on the required function. The damping means 4-8 are arranged in principle together with the pump P in a common receiving body 35. The different damping means 4, 5, 6, 7, 8 which are shown symbolically by pictograms comprise by way of example one or more damping chambers, orifices and a symbolically illustrated elasticity 4, 5 containing one or more pulsation damping capsules 11, 11', 11" or pulsation damping cells which have such a compressibility that a defined hydraulic volume can be received within a damper chamber.

Figure 2:
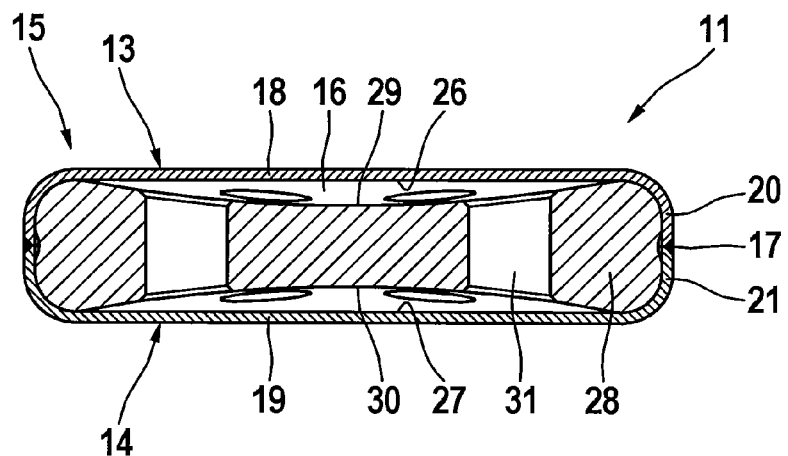
FIG. 2 shows a pulsation damping capsule in section in the unloaded state and on an enlarged scale.
Figure 3:
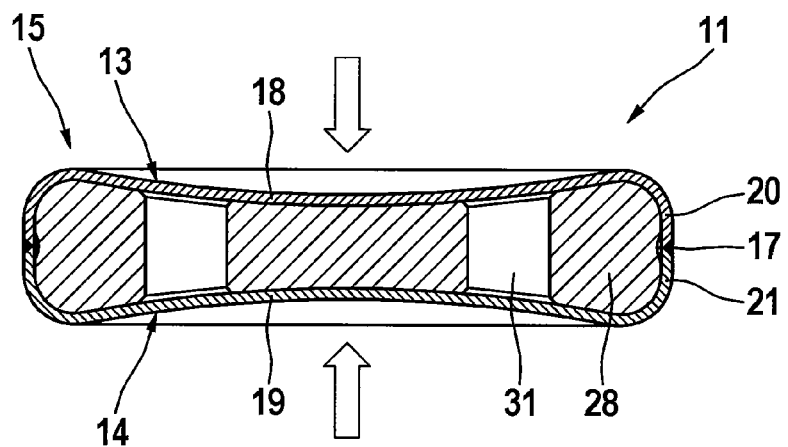
FIG. 3 shows a pulsation damping capsule as in FIG. 1, but in the loaded state.

FIG. 2 shows in detail a pulsation damping capsule 11 for use within a hydraulically loaded pulsation damping chamber 12. The pulsation damping capsule 11 comprises a metal diaphragm housing 15 which is joined in a hermetically sealed manner from two, preferably concave, half shells 13, 14. Although the half shells are formed without the removal of material, a hardenable, stainless metal material is advantageously used, such as, in particular, spring steel of the type 1.4568 with a wall thickness of only approximately a few tenths of a millimeter (by way of example a wall thickness of approximately 0.1 mm). The thin diaphragm which is formed produces a fatigue-resistant, hermetically sealed inner space 16 which is separated from the surrounding pressure means of the pulsation damping chamber 12, which pressure means usually pulsates at a low frequency (excitation frequency approximately less than 33 Hz).

Figure 16:
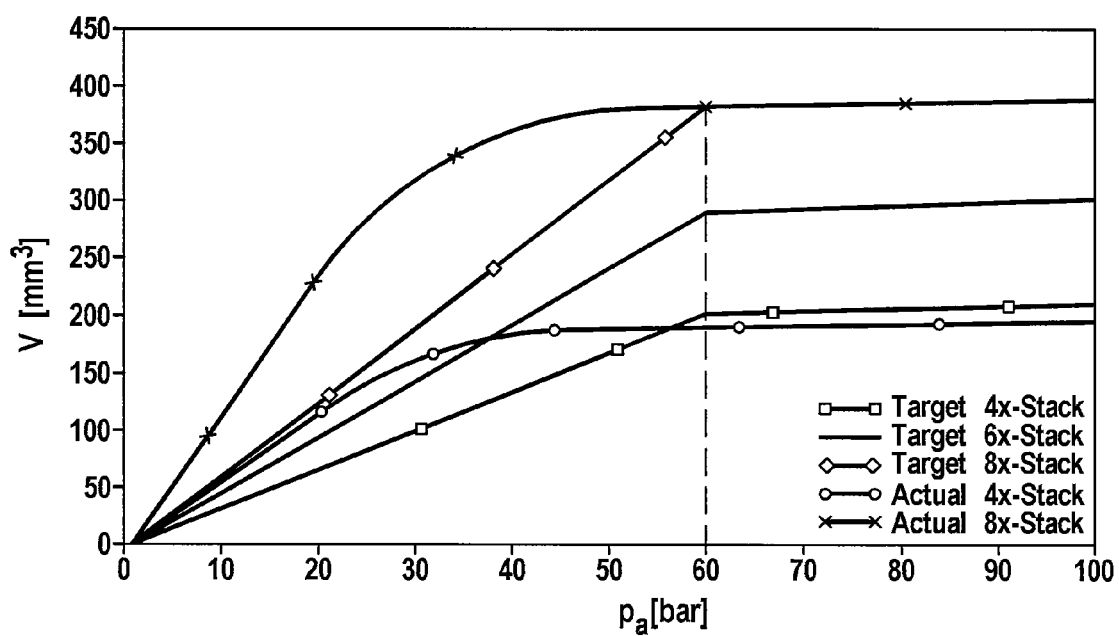
FIG. 16 shows a partially diagrammatic comparison of the requirements and the actual pressure volume behavior of different embodiments of pulsation damping capsules.

The half shells 13, 14 are connected to one another along a circumferential seam 17 with a material to material fit in such a way that a pulsating pressure means brings about an elastic compression or expansion of the pulsation damping capsule 11, under the action of which the inner space 16 is reduced in size or enlarged. As a result, the pulsation damping chamber 12 which is filled with at least one pulsation damping capsule serves to achieve a largely linearly growing pressure means volume uptake V up to approximately a maximum of 400 mm$^3$ with a rising pressure means pressure $p_a$ within a predefined pressure working range according to FIG. 16. To this end, an overview of the different targets and the different, concrete measured results (actual) with quadruple, sextuple or octuple arrangements (stacks) of the pulsation damping capsules can be gathered from FIG. 16. The predefined pressure working range, in other words the operating damping range, always extends as far as approximately 60 bar pressure means pressure $p_a$. Because, however, the pressure means pressure $p_a$ generated within vehicle brake systems can grow as far as above approximately 200 bar, a constant volume uptake is required above the defined, upper limit of the provided pressure working range, without overshoots being able to cause irreversible damage. This is achieved substantially by virtue of the fact that a further volume uptake is ended in a defined manner by an integrated stop function.

Each half shell 13, 14 is preferably configured in a bowl-like manner with a diaphragm-like bottom 18, 19 and with a wall 20, 21 which is angled away approximately at a right angle from the bottom 18, 19. In each case two identically shaped half shells 13, 14 are laid with their wall 20, 21 onto one another immediately directly, and mirror-symmetrically end to end. According to FIG. 2, the circumferential seam 17 which forms the outer circumference is provided for the hermetic material to material connection of the half shells 13, 14.

As can be seen, the circumferential seam 17 does not protrude substantially in the radial direction beyond the wall 20, 21, but rather is inserted substantially completely smoothly into the course of the wall 20, 21.

Figure 4:
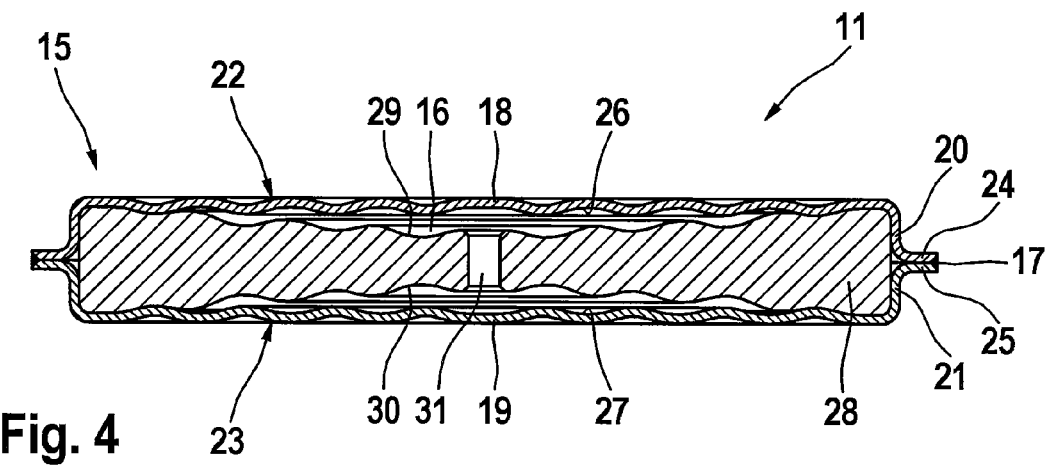
FIG. 4 shows another embodiment of the pulsation damping capsule in section.
Figure 5:
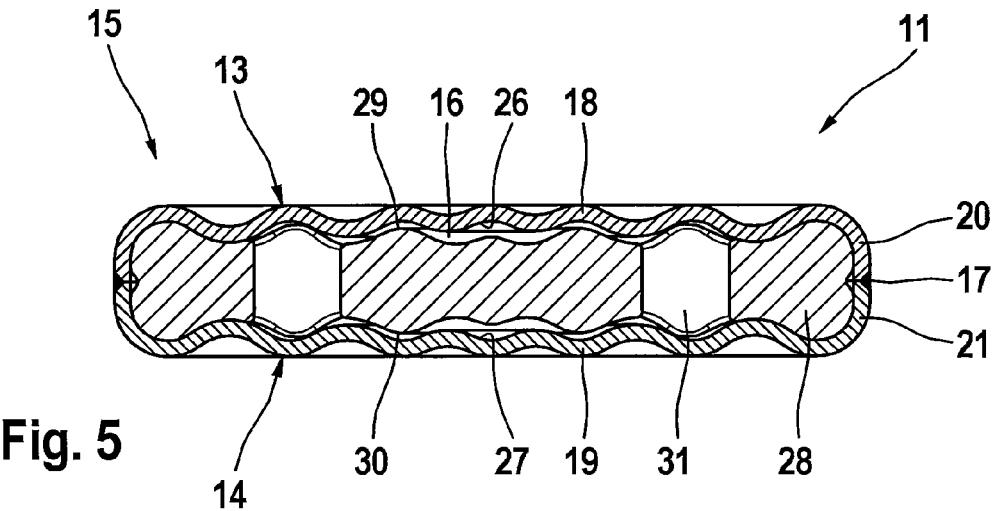
FIG. 5 shows another embodiment of the pulsation damping capsule with structuring, on an enlarged scale and in section.
Figure 6:
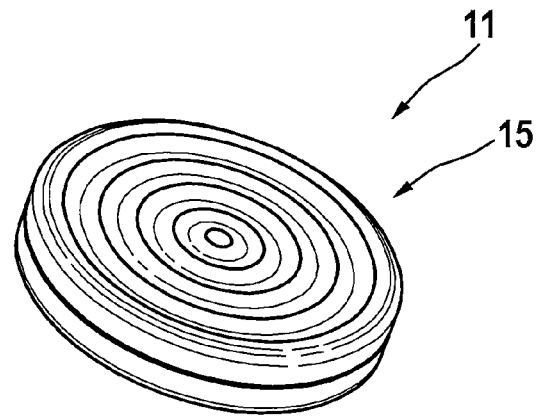
FIG. 6 shows a perspective view of the pulsation damper capsule according to FIG. 5 on a reduced scale, FIG. 7 partially shows a pulsation damping capsule as in FIG. 5; with clarification of mechanical stresses.
Figure 7:
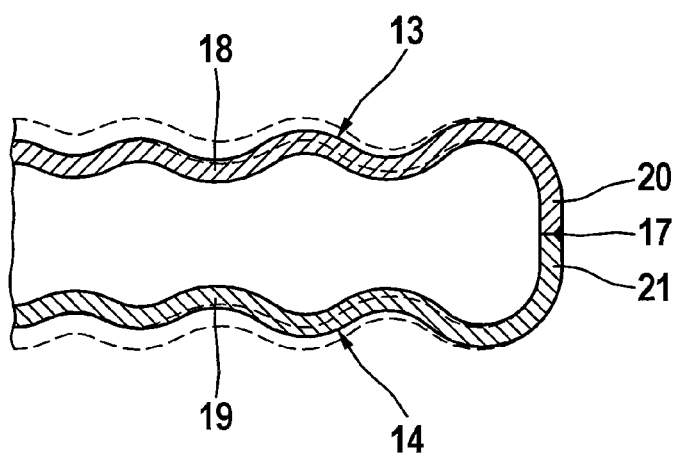
Figure 8:
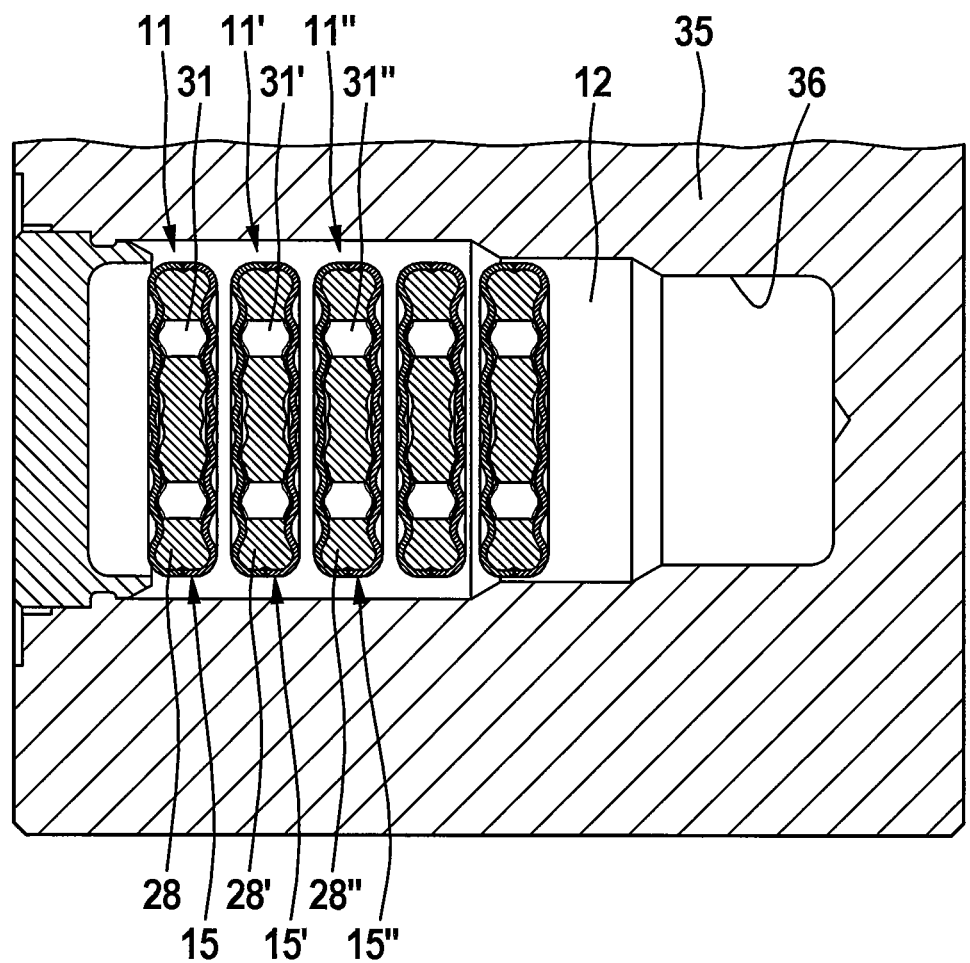
FIG. 8 shows a partial section through a hydraulic receiving body with a pulsation damping chamber and a plurality of inserted pulsation damping capsules.
Figure 9:
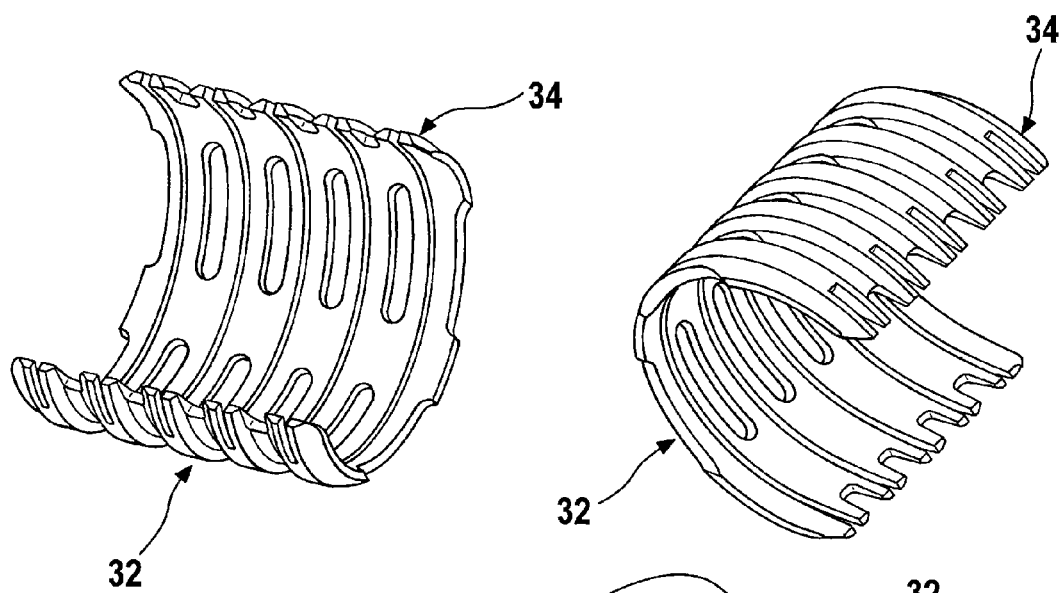
FIG. 9 shows a diagram for forming an assembled combination (stack) of a plurality of pulsation damping capsules with the use of holding means.
Figure 9:
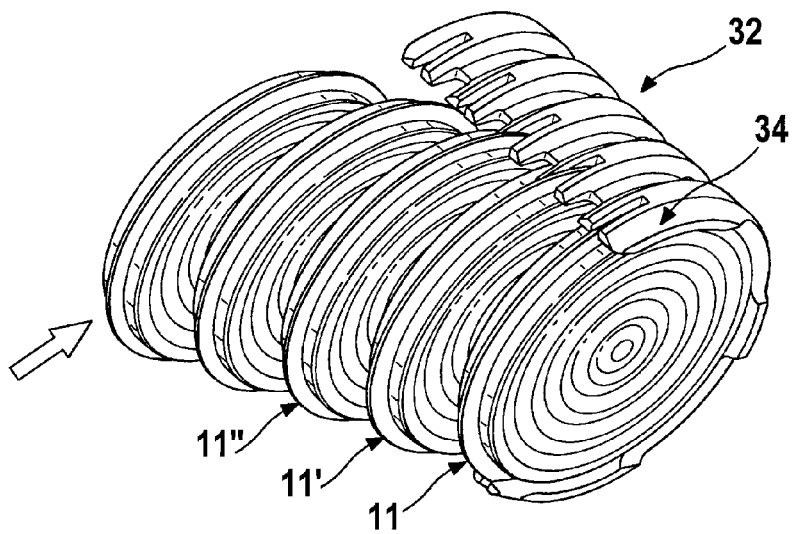
Figure 10:
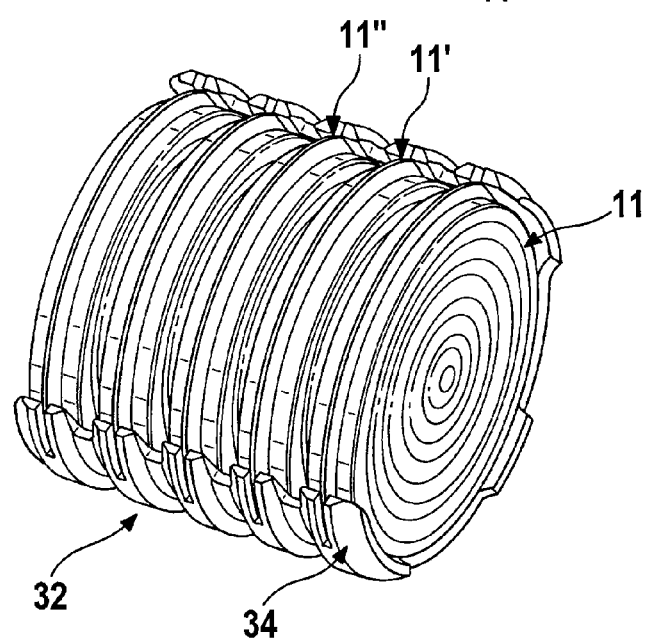
FIG. 10 shows a perspective view of a combination of a plurality of pulsation damping capsules.
Figure 14:
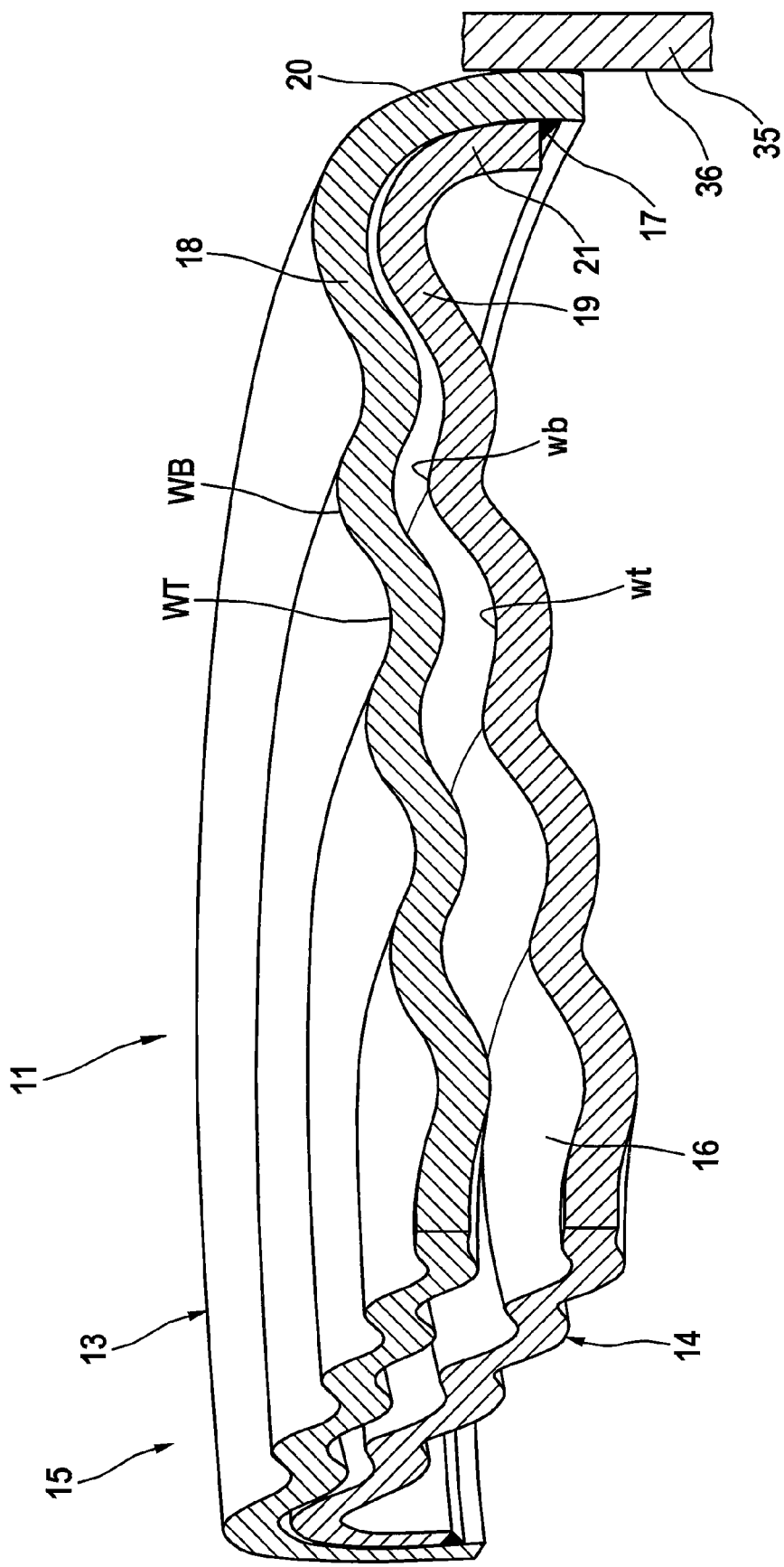

The refinement according to FIG. 4 differs from the preceding proposal in that each half shell 22, 23 has an integrally formed flange section 24, 25 which is angled away substantially at a right angle from the wall 20, 21 and such that it points radially to the outside. The circumferential seam 17 is placed from the radial outside between the two separate flange sections 24, 25. As a result of this measure, the welded seam is placed in a particularly protected manner with regard to alternating loading and, in particular, damaging tensile loadings. Furthermore, it can be seen from FIG. 4 and from the further FIGS. 5-13 that the half shells 22, 23 are provided, particularly in the region of the base 18, 19, with a profiling, in particular with a rotationally symmetrical, wave-shaped profiling. In contrast to the embodiments according to FIGS. 4 to 8, the wave shape of the profiling can be configured according to a modified embodiment according to FIG. 14 in such a way that they nestle as far as possible in one another (FIG. 14) for the largely complete compression of a pulsation damping capsule 11. To this end, in each case one wave crest Wb of an upper half shell 13 is assigned a wave crest wb of a lower half shell 14 and vice versa (wave troughs WT/wt). A further special feature comprises the fact that the half shells 13, 14; 22, 23 can have different diameters, with the result that in each case one of the half shells 13, 14; 22, 23 is as it were inserted into a half shell of greater diameter and, as a result, is as it were preliminarily positioned for a production process, without a separate holding apparatus. In a comparable manner with the embodiment according to FIG. 4, this results in placing of the circumferential seam 17 which is particularly suitable for loading. The wall 20, 21 is oriented uniformly and is angled off at a right angle from the bottom 18, 19, and is provided with an axially directed circumferential seam 17. This design has the advantage that the uniformly angled away wall 20, 21 makes it possible to insert a pulsation damping capsule fixedly into a hole 36 of corresponding dimensions by means of a resilient clamping action, the circumferential seam being protected against damage by a pressing in operation. Radial pressure means recirculation is made possible by it being possible for separate channels to be provided in the hole 36 from the receiving body 35.

As has been explained briefly, an application in an electronically regulated vehicle brake system requires in principle a particularly adapted pressure/volume uptake behavior of the damping apparatus 3. In this context, it can be required that a volume uptake in relation to the prevailing pressure initially increases linearly as the pressure increases, and that this volume uptake remains constant above a predefined volume uptake. For this purpose, each pulsation damping capsule 11 has at least one integrated means which is suitable for limiting the extent of an elastic compression. In other words, the integrated means which can be defined by the shape of the shells themselves, that is to say without separate components, ensures that no further compression of the pulsation damping capsule/cell occurs, with the result that deformation and volume uptake are limited mechanically (kept constant) above defined pressures.

According to one preferred variant, the integrated means is configured as an integrated stop means, each inner space-side bottom 18, 19 being configured for forming the integrated stop means in the meaning of a stop face 26, 27. The outlay on apparatus and production technology is minimized by the bottom 18, 19 fulfilling as it were a double function which comprises the fact that not only a hermetic inner space boundary, but also a limiting of the volume uptake is achieved by immediately direct, metallic contact of the adjacent bottoms 18, 19.

In a modification of an immediately direct stop function of two immediately directly adjacent bottoms 18, 19, there can be provision according to another preferred solution for an incompressible medium to be provided as integrated means and, additionally to this, a compressible filling element 28, for example made from elastomer material, in the inner space 16 of the damping capsule 11, which filling element 28 can likewise have a structuring, preferably wave crests and wave troughs, congruently with respect to an adjacent, structured bottom, in particular structured in a wave shape. If a completely incompressible filling element 28 or a completely incompressible medium is provided, the inner space 16 should be filled only partially with it, in order that there is compressibility for volume accumulation in another way. If, in contrast, there is a compressible filling of an elasticity which is preset in a defined manner, the inner space 16 can certainly be filled completely.

In order to set the predefined pressure/volume behavior, and also in order to avoid an impermissible deformation or loading of the half shells 13, 14; 22, 23, an unstructured filling element 28 for supporting the wall 20, 21 can bear substantially completely against the half shells 13, 14; 22, 23 in this region. Further faces of the filling element 28 are provided at a spacing from the bottom 19, 20, with the result that the bottom 19, 20 can compress elastically as it were. The stop faces 29, 30 on the filling element 28 which are assigned to the stop faces 26, 27 serve to limit this elastic deformation.

In principle, the filling element 28 can have one or more recesses 31 which in principle are configured as a through hole parallel to the longitudinal axis, in order for it to be possible to assist a medium uptake or a deformation of the filling element 28 itself. The filling element 28 is advantageously configured metallically, from rubber or plastic, and is preassembled as an insert between the half shells 13, 14; 22, 23. This can be effected by the filling element 28 being stitched or fastened fixedly to a half shell 13, 14; 22, 23 in such a way that rattling noise is avoided. The same is otherwise also true for pulsation damping capsules 11 which are adjacent to one another, and for the ratio between pulsation damping capsules 11 and receiving body 35.

Figure 15:
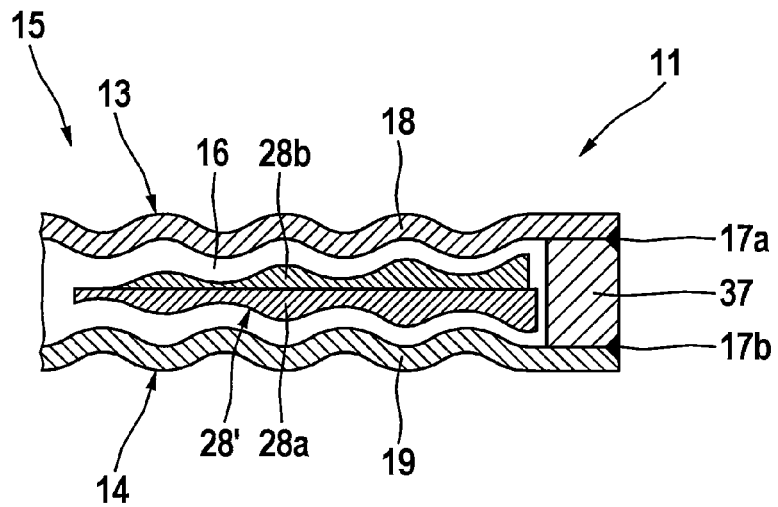

The result tendentially of the given capsule construction is that the edge region makes comparatively low volume uptake possible, whereas maximum elastic deformation predominantly occurs in the center of the bottom of the half shells. The following measures serve to improve the entire volume uptake as a result of an improvement in the edge-side elasticity. To this end, in one embodiment of a pulsation damping capsule 11 with a filling element 28' of wave-shaped structure according to FIG. 15, said filling element 28' is configured such that it is segmented into at least two parts 28a, 28b which can be displaced parallel to one another, in such a way that tolerances of adjacent components, in particular tolerances in the wave structure of adjacent components and/or during the elastic compression operation of the bottoms 18, 19, can be compensated for. A further advantage comprises the fact that the edge-side decoupling (omission of the clamping of the filling element 28', which clamping is fixed on the edge side) brings about a significantly increased volume uptake. As a result, the concrete illustration also differs from the above-described embodiments as a result of the bottoms 18, 19 of wave-shaped structure with the use of a spacing element placed in between, namely a cylindrical ring 36 which in principle can be formed either from metal material or, in the sense of a further spring element, from elastomer material, which further increases the volume uptake of the pulsation damping capsule 11. The entire structure can be joined together by two welded circumferential seams. Play is provided in the radial direction between the outer circumference of the filling element 28' or its parts 28a, 28b and the ring 36, with the result that the filling element 28' can be adapted to the bottoms 18, 19 for optimum support.

In a further modification of a pulsation damping capsule 11, there can be provision for the inner space 16 to be provided with a vacuum, with an air or gas filling, or with a liquid for the purpose of configuring the predefined pressure/volume behavior.

Further embodiments of the invention comprise a plurality of identically configured pulsation damping capsules 11, 11', 11" being arranged together within a pulsation damping chamber 12. Here, it is particularly advantageous as an alternative to loose placing of the individual pulsation damping capsules 11, 11', 11" within the pulsation damping chamber 12 if a grouping or bundling of a plurality of identical pulsation damping capsules 11, 11', 11" is provided, with the result that as it were only a preassembled module is to be inserted into the pulsation damping chamber 12, and that each bundle has at least one holding means 32 which is provided for the directed securing and placing of the pulsation damping capsules 11, 11', 11". It is a basic concept of an arrangement planned in this way to provide a defined spacing between the pulsation damping capsules 11, 11', 11", which spacing improves ventilation of the brake system. The unit can be formed with the addition of a hole closure for pulsation damping chamber 12 as in FIG. 8.

Each holding means 32 is arranged integrally with or separately from the pulsation damping capsules 11, 11', 11". It is generally possible that the holding means 32 is connected with a material to material fit and/or nonpositively to one or to a plurality of pulsation damping capsules 11, 11', 11". Each holding means 32 ensures a cohesion between the pulsation damping capsules 11, 11', 11" which are joined together. In this context, it is possible to configure each holding means 32 as a metallic binding which is made from sheet metal and/or wire and is guided overall around all the cells to be bundled.

Figure 11:
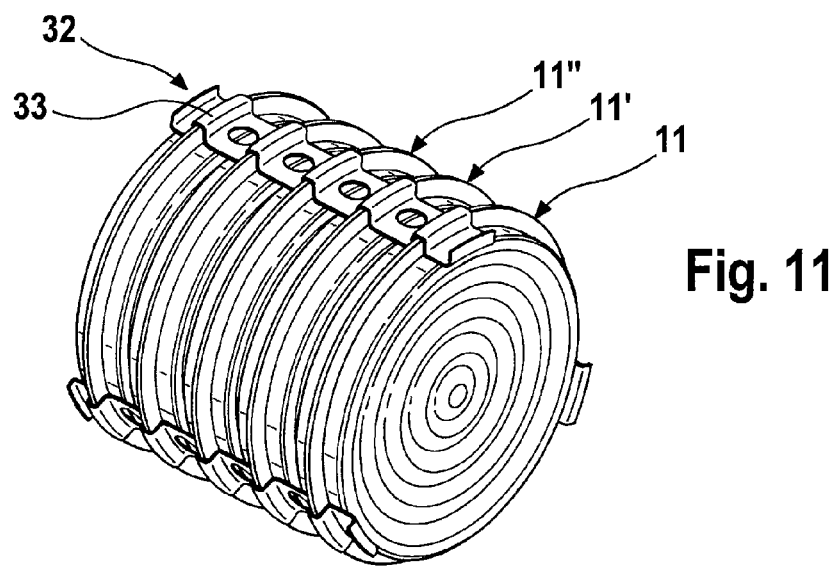
FIG. 11 shows a perspective view of a combination of a plurality of pulsation damping capsules with modified holding means.
Figure 12:
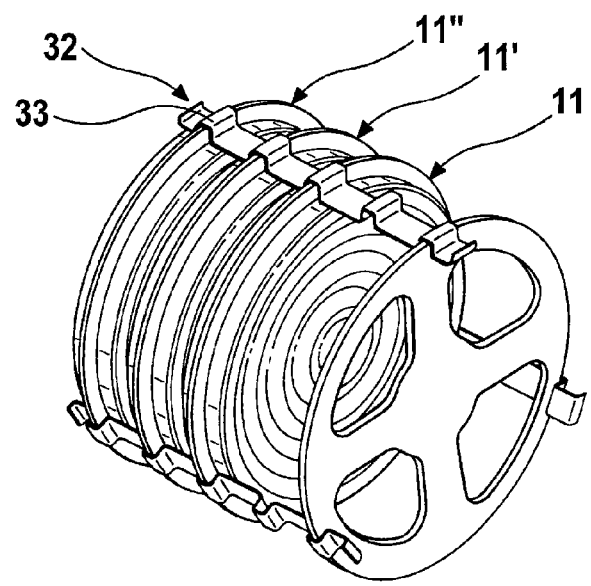
FIG. 12 shows a perspective view of a combination of a plurality of pulsation damping capsules with modified holding means.
Figure 13:
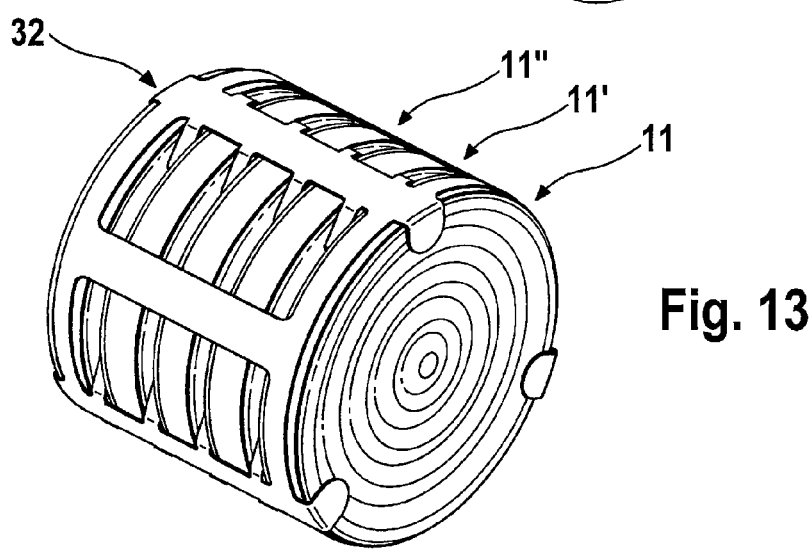
FIG. 13 shows a perspective view of a combination of a plurality of pulsation damping capsules with modified holding means, and FIGS. 14, 15 in each case diagrammatically (and not to scale) show further embodiments of a pulsation damping capsule in section.

A gradual modification of this principle comprises the fact that holding means 32 comprise largely strip-shaped sheet metal material with a plurality of receptacles 33 which act, in particular, on the flange section 24 of the pulsation damping capsules 11, 11', 11", as is apparent from FIGS. 11 and 12. In this way, it is ensured that the individual pulsation damping capsules 11, 11', 11" are arranged at a defined spacing from one another, which simplifies a ventilation and a downstream pressure means filling of a receiving body 35.

Furthermore, it is conceivable that each holding means 32 is provided as a tubular body which is slotted to as great an extent as possible and has receptacles 34 which act radially on the outside for the pulsation damping capsules 11, 11', 11", with the result that the latter are placed in a defined manner at a predefined regular spacing from one another. Holding means 34 of this type can advantageously be configured from elastic plastic material, in order to make elastic assembly or dismantling possible, as is apparent from FIGS. 9 and 10.

It is advantageous in principle to provide a plurality of identically configured holding means 32, in order to achieve an economical effect of quantity.

In a further refinement of the present basic concept of a modular adaptation of a damping characteristic, it can be appropriate and required to add an additional spring element, such as, in particular, an individual half shell, to one or more pulsation damping capsules 11, 11', 11", without departing from the essence of the invention. It goes without saying that this separate half shell, just like the remaining pulsation damping capsules 11, 11', 11", may be a constituent part of a preassembled grouping which can be handled with one hand, for simplifying the assembly in the receiving body 35.

Although the invention has primarily been explained using the example of an application in an electronically regulated vehicle brake system, other types of applications are possible without departing from the core concept of the invention.

The invention claimed is:

1. A pulsation damping capsule comprising:
   at least one metal diaphragm housing which is joined in a hermetically sealed manner from at least two shells and separates an inner space from a surrounding pressure medium, the shells being connected to one another along a circumferential seam with a material to material fit in such a way that the pulsation damping capsule is configured to be elastically compressed and expanded as an energy accumulator as a consequence of pressure medium action, and
   a filling element at least partially filling an inner space of the pulsation damping capsule for a stop function, the filling element composed of a metallic or a plastic material, and provided as an insert part.

2. The pulsation damping capsule as claimed in claim 1, wherein the pulsation damping capsule has an at least partially linear volume uptake as a function of a pressure of the surrounding pressure medium.

3. The pulsation damping capsule as claimed in claim 1, wherein the pulsation damping capsule has a linear volume uptake substantially exclusively within a predefined pressure working range, and in that a constant volume uptake is provided above the predefined pressure working range.

4. The pulsation damping capsule as claimed in claim 1, wherein each half shell is provided in a bowl-like manner with a bottom and with a wall which is angled away approximately at a right angle from the bottom, in that in each case two identically shaped half shells adjoin one another immediately directly, and mirror-symmetrically end to end with their wall, and in that the circumferential seam is provided for connecting adjacent walls of the half shells.

5. The pulsation damping capsule as claimed in claim 4, wherein the wall of each half shell has an integrally formed flange section which is angled away substantially at a right angle from the wall and such that it points radially outside.

6. The pulsation damping capsule as claimed in claim 4, wherein the pulsation damping capsule has an integrated stop means which limits a spring-elastic compression.

7. The pulsation damping capsule as claimed in claim 6, wherein each bottom is formed on the side of the inner space as a stop face in order to form the integrated stop means.

8. The pulsation damping capsule as claimed in claim 6, wherein the filling element is provided as the integrated means.

9. The pulsation damping capsule as claimed in claim 8, wherein the filling element bears substantially completely against the half shells in a region of the wall, and in that the filling element has a stop face at a spacing from an adjacent bottom.

10. The pulsation damping capsule as claimed in claim 8, wherein the filling element has one or more recesses.

11. The pulsation damping capsule as claimed in claim 8, wherein the filling element is configured such that it is segmented into at least two parts in such a way that tolerances of adjacent components are compensated for.

12. The pulsation damping capsule as claimed in claim 11, wherein the filling element is configured such that it is segmented into at least two parts in such a way that tolerances of adjacent components in a wave structure and/or during an elastic compression operation of the bottoms are compensated for.

13. The pulsation damping capsule as claimed in claim 8, wherein a gas filling or a liquid is provided as medium.

14. The pulsation damping capsule as claimed in claim 1, wherein the half shells have a profiling.

15. The pulsation damping capsule as claimed in claim 1, wherein the half shells have a rotationally symmetrical profiling.

16. A pulsation damping module, comprising a plurality of substantially identical pulsation damping capsules which are provided as energy accumulators, the pulsation damping capsules being provided loosely or as a bundle in a formed combination for pulsation damping, each of the pulsation damping capsules comprising at least one metal diaphragm housing which is joined in a hermetically sealed manner from at least two shells and separates an inner space from a surrounding pressure medium, the shells being connected to one another along a circumferential seam with a material to material fit in such a way that the pulsation damping capsule is configured to be elastically compressed and expanded as an energy accumulator as a consequence of pressure medium action.

17. The pulsation damping module as claimed in claim 16, wherein the bundle of pulsation damping capsules is positioned within a pulsation damper chamber of a receiving body of a hydraulic assembly, said chamber being provided such that it is integrated into a suction path or into a pressure path of a pump.

18. The pulsation damping module as claimed in claim 17, wherein the bundle of pulsation damping capsules is positioned within a damper chamber of an electronically regulated vehicle brake system.

19. The pulsation damping module as claimed in claim 16, further comprising at least one individual, separate half shell for damping adaptation.

20. The pulsation damping module as claimed in claim 16, wherein each bundle has holding means which are provided for directed holding and placing of the pulsation damping capsules.

21. The pulsation damping module as claimed in claim 20, wherein the holding means is configured as a metallic binding made from sheet metal and/or wire, and in that one or more of the pulsation damping capsules is/are welded to the holding means.

22. The pulsation damping module as claimed in claim 20, wherein each holding means is provided as a separate component, in that the component has receiving and holding means for a plurality of damping capsules, and in that the receiving and holding means act in a sprung manner, substantially from the radial outside, on the walls of the damping capsules.

23. The pulsation damping module as claimed in claim 20, wherein a plurality of identically configured holding means are provided.

24. A pulsation damping capsule comprising at least one metal diaphragm housing which is joined in a hermetically sealed manner from at least two shells and separates an inner space from a surrounding pressure medium, the shells being connected to one another along a circumferential seam with a material to material fit in such a way that the pulsation damping capsule is configured to be elastically compressed and expanded as an energy accumulator as a consequence of pressure medium action, wherein each half shell is a concave half shell.

25. The pulsation damping module as claimed in claim 1, wherein the pulsation damping capsule is configured to be elastically compressed and expanded as an energy accumulator as a consequence of pressure medium pulsation.

* * * * *